United States Patent
Dralyuk

(10) Patent No.: US 6,945,510 B2
(45) Date of Patent: Sep. 20, 2005

(54) SOLENOID VALVE FOR USE IN MICRO-GRAVITY

(75) Inventor: Igor N. Dralyuk, Lyndhurst, OH (US)

(73) Assignee: Analex Corporation, Alexandria, VA (US)

( * ) Notice: Subject to any disclaimer, the term of this patent is extended or adjusted under 35 U.S.C. 154(b) by 146 days.

(21) Appl. No.: 10/374,072

(22) Filed: Feb. 27, 2003

(65) Prior Publication Data

US 2003/0168620 A1 Sep. 11, 2003

Related U.S. Application Data

(60) Provisional application No. 60/361,349, filed on Mar. 5, 2002.

(51) Int. Cl.[7] .............................................. F16K 31/02
(52) U.S. Cl. .............................. 251/129.15; 137/15.17; 137/315.03
(58) Field of Search ....................... 251/129.01, 129.15, 251/332; 137/15.17, 15.18, 315.03; 335/260, 278

(56) References Cited

U.S. PATENT DOCUMENTS

| | | | | |
|---|---|---|---|---|
| 3,082,359 A | * | 3/1963 | Mangiafico et al. | 335/261 |
| 4,624,282 A | * | 11/1986 | Fargo | 137/559.16 |
| 4,671,488 A | * | 6/1987 | Zeuner et al. | 251/118 |
| 5,052,174 A | * | 10/1991 | Bak | 60/39.281 |

* cited by examiner

Primary Examiner—Edward K. Look
Assistant Examiner—John K. Fristoe, Jr.
(74) Attorney, Agent, or Firm—Finnegan, Henderson, Farabow, Garrett & Dunner, L.L.P.

(57) ABSTRACT

A valve comprising an electromagnetic solenoid assembly, a valve assembly, and a fastening device is provided. The fastening device is configured to removably couple the electromagnetic solenoid assembly to the valve assembly. The fastening device is retained by the electromagnetic solenoid assembly when the electromagnetic solenoid assembly is uncoupled from the valve assembly. The valve assembly may include a valve body having a valve seat surface and a valve element having a seating surface to seat against the valve seat surface. The valve seat surface may include a resilient sealing element and a hard stop element, such that the valve element in a closed, seated position provides a substantially zero leakage valve closure.

24 Claims, 5 Drawing Sheets

SOLENOID VALVE FOR USE IN MICRO-GRAVITY

CROSS REFERENCE TO RELATED APPLICATION

This application is related to and claims the benefit of priority under 35 U.S.C. 119(e) to U.S. Provisional Patent Application No. 60/361,349, filed on Mar. 5, 2002, the disclosure of which is expressly incorporated herein by reference in its entirety.

BACKGROUND OF THE INVENTION

The present invention relates to valves and, more particularly, to solenoid valves for use in micro-gravity environments, for use in vibration environments, and for use with high pressure fluids.

Solenoid valves are typically made by manufacturing a solenoid subassembly separately from a valve body subassembly and then coupling these subassemblies together. Certain solenoid valves provide for the subsequent uncoupling of these two subassemblies, for instance, to replace the solenoid. Threaded fasteners or snap rings have been used to couple solenoid subassemblies to valve body subassemblies. For example, Skinner's solenoid valves typically use a threaded nut, paired with a washer, to couple the solenoid subassembly to the valve body subassembly. During the replacement of a solenoid subassembly, these threaded fasteners, washers, or snap rings are separated from the subassemblies and become small, loose items. Such small, loose items are easily lost or misplaced. In a microgravity environment, such small, loose items can float away and create dangerous situations. For instance, a loose nut could become lodged between an airlock door and its frame, preventing its airtight closure.

The typical solenoid valve includes a slidable plunger that moves from a first non-actuated resting position when the solenoid is not energized to an actuated position when the solenoid is energized. This plunger may be directly coupled to the valve element that seats against the valve seat when the valve is closed. In such instances, the plunger may be spring biased in order to bias the valve element in either an open or closed position. Alternatively, the plunger may interact with a poppet, rather than be directly coupled to the valve element. In such plunger/poppet valves, the poppet, not the plunger, is spring biased in either an open or closed position. Given sufficiently high vibration loads, the plunger of such a poppet/plunger valve may be moved from its non-actuated resting position to its actuated position even if the electromagnetic coil is not energized. Under these conditions, the vibration loads could cause the unwanted opening (or closing) of the valve.

When a valve is closed, it is desirably to not have any leakage past the valve seat. Providing an adequate seal between the valve element and the valve seat can become a significant problem if the fluid controlled by the valve is under high pressure.

The valve of the present invention is intended to solve one or more of the problems set forth above.

SUMMARY OF THE INVENTION

One aspect of the present invention is directed to a valve comprising an electromagnetic solenoid assembly, a valve assembly, and a fastening device. The fastening device is configured to removably couple the electromagnetic solenoid assembly to the valve assembly. The fastening device is retained by the electromagnetic solenoid assembly when the electromagnetic solenoid assembly is uncoupled from the valve assembly.

In another aspect, the present invention is directed to a valve comprising an electromagnetic solenoid assembly, a valve assembly and a resilient sealing element. The valve assembly is coupled to the electromagnetic solenoid assembly and includes a valve body and a valve element. The valve body has a valve seat surface. The valve element has a seating surface to seat against the valve seat surface. The valve element is movable from a closed, seated position to an opened, unseated position. The resilient sealing element forms at least a portion of the valve seat surface.

In another aspect, the present invention is directed to a valve comprising an electromagnetic solenoid assembly, a valve assembly, and first and second spring elements. The valve assembly is coupled to the electromagnetic solenoid assembly and includes a valve body, a plunger, and a valve element. The valve body has a valve seat surface. The plunger is movable from a first plunger position when a current in the electromagnetic solenoid assembly is at a first level to a second plunger position when the current in the electromagnetic solenoid assembly is at a second level. The valve element has a seating surface to seat against the valve seat surface. The valve element is movable from a seated position when the plunger is in the first plunger position to an unseated position when the plunger is in the second plunger position. The first spring element biases the valve element relative to the valve body. The second spring element biases the plunger relative to the valve body.

It is to be understood that both the foregoing general description and the following detailed description are exemplary and explanatory only and are not restrictive of the invention, as claimed.

BRIEF DESCRIPTION OF THE DRAWINGS

The accompanying drawings, which are incorporated in and constitute a part of this specification, illustrate several embodiments of the invention and together with the description, serve to explain the principles of the invention. In the drawings.

DETAILED DESCRIPTION

Reference will now be made in detail to exemplary embodiments of the invention, which are illustrated in the accompanying drawings. Wherever possible, the same reference numbers will be used throughout the drawings to refer to the same or like parts.

Figure 1:
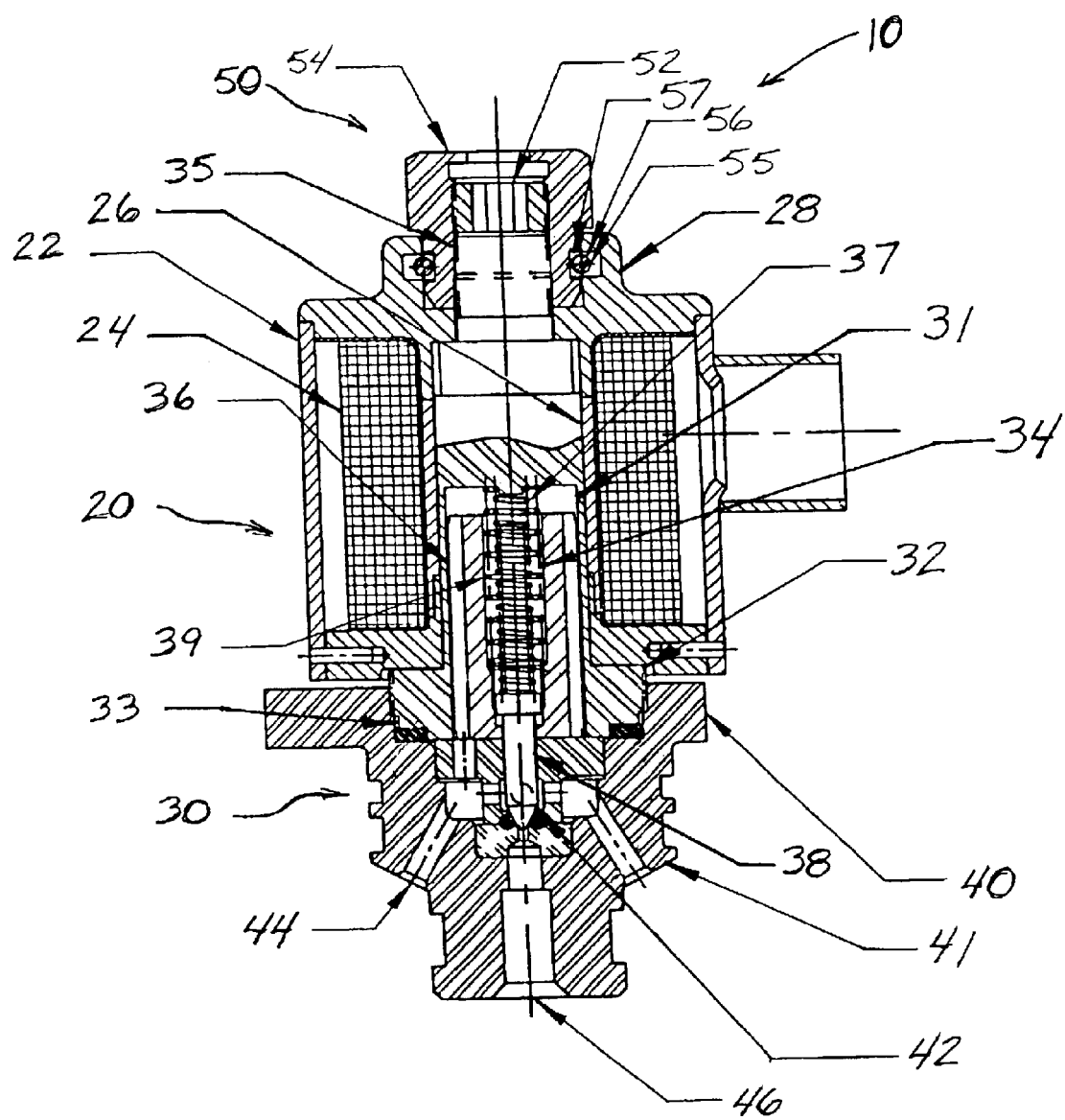
FIG. 1 is a partial section view of a valve in a closed position in accordance with an exemplary embodiment of the present invention.

An exemplary embodiment of a solenoid valve in accordance with the present invention is illustrated in FIG. 1 and is designated generally by reference number 10. As shown, valve 10 includes an electromagnetic solenoid assembly 20 coupled to a valve assembly 30. Valve 10 may control the flow of water, steam, air, oil, or any fluid, gas, or combination of fluid and gas. Further, although valve 10 is depicted in the exemplary embodiments as a two-way valve in a normally closed position, this is not meant to be limiting. Valve 10 could default to an opened or closed position, or to some intermediate position. Valve 10 could also be, for instance, a three-way valve. Moreover, the present invention is not limited to poppet/plunger-type valves, but may also, for example, be provided in conjunction with spool-type valves.

As shown in FIG. 1, electromagnetic solenoid assembly 20 includes a housing 22 and an electromagnetic coil 24 mounted within housing 22. Electromagnetic coil 24 could be any standard or specially designed solenoid winding. Typically, coil 24 is made of copper windings, but any electrically conductive material may be used. Housing 22 includes a central throughbore 26, which is coaxial with a central axis of coil 24. Housing 22 may also include a mounting hub 28. Housing 22 will typically be made of a magnetic steel, for instance, a 400 series stainless steel or a low carbon steel, nickel plated.

Valve assembly 30, as shown in FIG. 1, includes a valve sleeve 32, a valve body 40, a plunger 36, and a valve element 38. Valve sleeve 32 extends through the center of electromagnetic coil 24 and through throughbore 26 of housing 22. Valve sleeve 32 has a first end 33 extending from the portion of electromagnetic solenoid assembly 20 adjacent valve body 40 and a second end 35 adjacent mounting hub 28 of housing 22. First end 33 may have threads or other fastening means to couple valve sleeve 32 to valve body 40. Second end 35 may also be threaded. Valve sleeve 32 is shown with a central bore 31.

Figure 2:
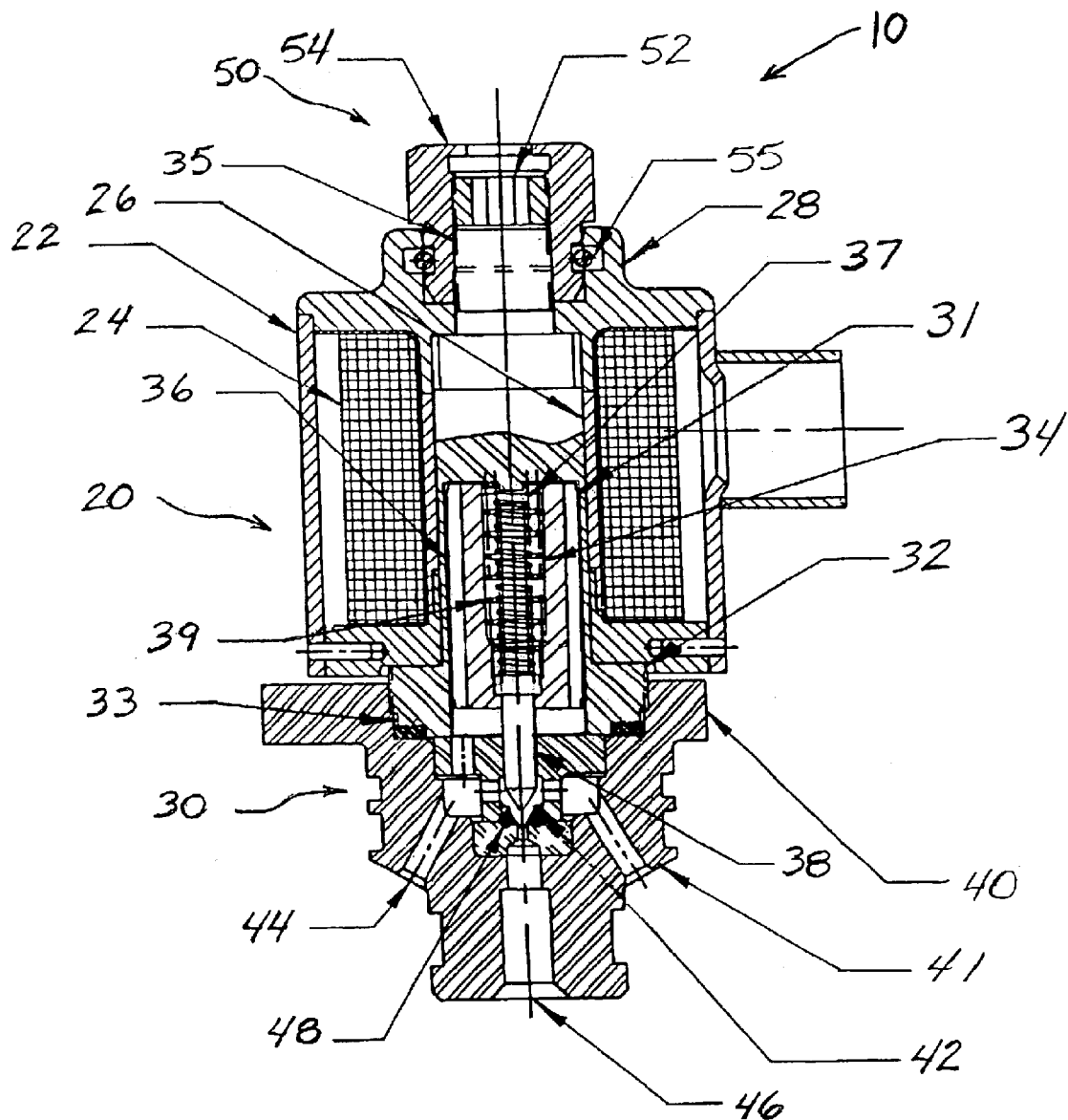
FIG. 2 is a partial section view of the valve of FIG. 1 in an open position.

As illustrated in FIGS. 1 and 2, plunger 36 is slidably located within central bore 31 of valve sleeve 32. Plunger 36, which acts as an armature for electromagnetic coil 24, moves from a first plunger position when a current in electromagnetic coil 24 is at a first level, as shown in FIG. 1, to a second plunger position when said current in electromagnetic coil 24 is at a second level, as shown in FIG. 2. Typically, the current at either the first or the second level is zero, in which case the electromagnetic coil is not energized and plunger 36 is not subjected to any electromagnetic forces. Plunger 36 has a central throughbore 34.

Figure 3:
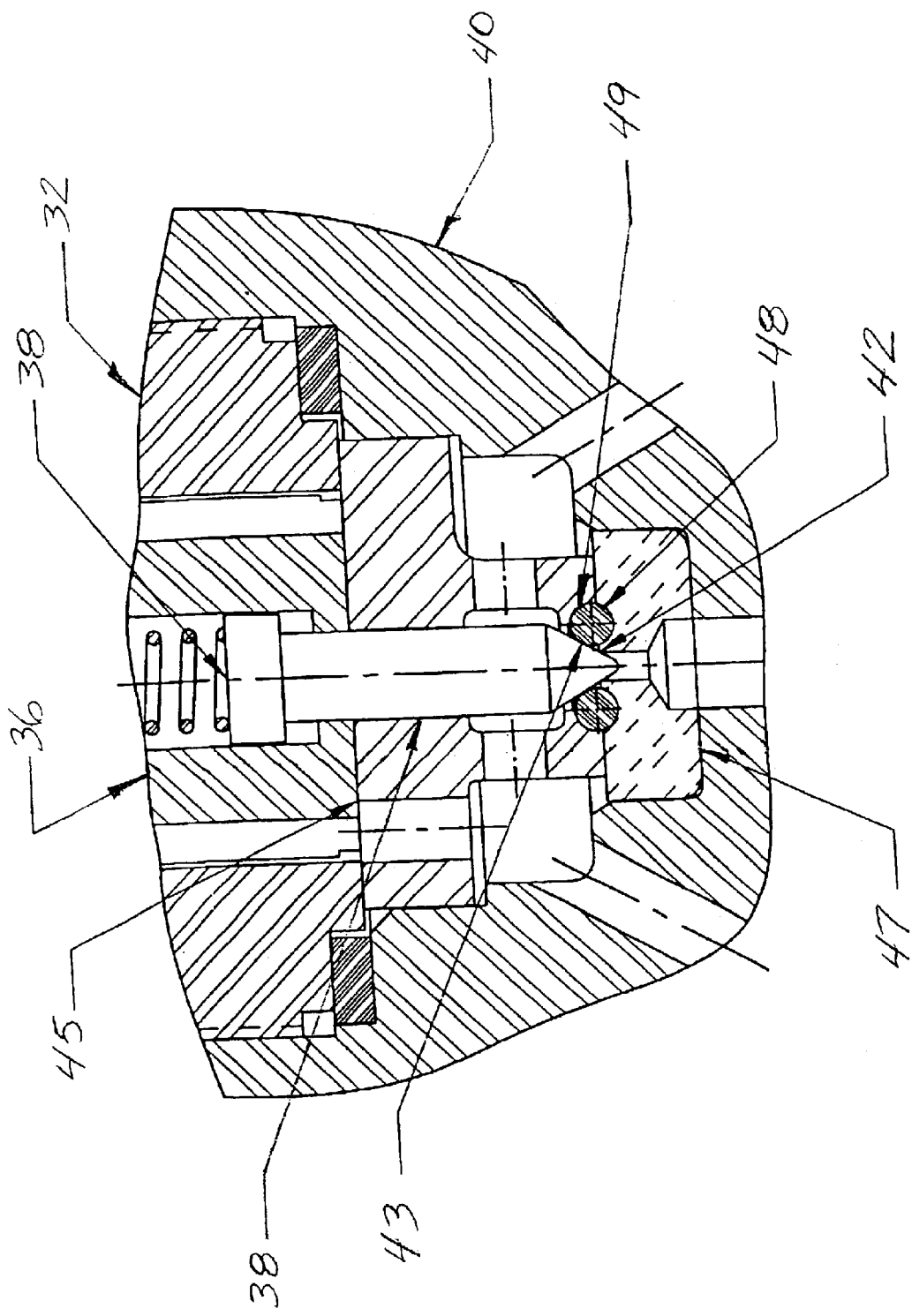
FIG. 3 is a detail of the valve seat area of the valve of FIG. 1.

Valve element 38 is partially located within central throughbore 34 of plunger 36. As shown in FIGS. 1 and 2, valve element 38 is a spring-loaded poppet. As best shown in FIG. 3, valve element 38 has a seating surface 43 which seats against a valve seat surface 42 of valve body 40 when valve 10 is closed. As described below, valve seat surface 42 may include a seat insert element 47, which provides a hard seat for seating surface 43, and a resilient sealing element 48, which provides a soft seal between seating surface 43 and valve body 40. Seating surface 43 may be conical, as shown in FIG. 3, although any other configuration as may be readily apparent to persons of ordinary skill in the art are considered to be within the scope of the present invention. Valve element 38 moves from a seated position when plunger 36 is in its first plunger position (FIG. 1) to an unseated position when plunger 36 is in its second plunger position (FIG. 2).

As illustrated in FIGS. 1 and 2, valve assembly 30 may also include a first spring element 37 located within valve sleeve 32. First spring element 37, which extends between valve sleeve 32 and valve element 38, biases valve element 38 relative to valve body 40 and relative to valve sleeve 32. In particular, first spring element 37 is shown biasing valve element 38 toward valve seat surface 42, such that valve 10 is a normally closed position valve. Valve assembly 30 includes a second spring element 39 extending between valve sleeve 32 and plunger 36 to prevent valve opening during vibration and to allow valve installation in any position. Second spring element 39 biases plunger 36 relative to valve body 40 and relative to valve sleeve 32. Second spring element 39 biases plunger 36 toward valve seat surface 42. As shown in FIG. 1, first and second spring elements 37, 39 are helical compression springs. First and second spring elements 37, 39 are shown coaxially aligned, with first spring element 37 nested inside of second spring element 39. To prevent these nested springs from tangling with one another, first spring element 37 is a right-hand wound spring and second spring element 39 is a left-hand wound spring. Other alternative spring configurations and spring elements for biasing valve element 38 and plunger 36 in accordance with the invention, as may be readily apparent to persons of ordinary skill in the art, are considered to be within the scope of the present invention.

As shown in FIGS. 1 through 3 and as mentioned above, valve body 40 includes valve seat surface 42. Valve seat surface 42 may be composed of two valve seat surface elements: valve element guide 45 and seat insert element 47. Valve element guide 45 guides valve element 38. Seat insert element 47 provides a hard stop for valve element 38. Valve body 40, valve element guide 45 and seat insert element 47 may be formed from any suitable material as known to persons of ordinary skill in the art. For instance, valve body 40 may be brass, valve element guide 45 may be stainless steel, and seat insert element 47 may be a high hardness plastic.

As best shown in FIG. 3, valve seat surface 42 may include a resilient sealing element 48. Resilient sealing element 48 provides a seal between seating surface 43 of valve element 38 and valve seat surface 42. Resilient sealing element 48 may be a standard or specially made o-ring or gasket, which may be partially set into a groove in valve seat surface 42. Only a portion of sealing element 48 extends above the plane of the seat surface formed by valve element guide 45 and seat insert element 47, and this portion is compressed when valve element 38 closes valve 10. Alternatively, resilient sealing element 48 may be securely set into valve seat surface 42 by capturing it in a cavity 49 formed from adjacent channels in valve element guide 45 and seat insert element 47. For instance, seat insert element 47 may be inserted within valve body 40, resilient sealing element 48 placed in the channel of seat insert element 47, and then valve element guide 45 screwed or otherwise coupled to valve body 40, thereby securely retaining resilient sealing element 48 at least partially within the channels. With this configuration, resilient sealing element 48 may be replaced when worn or damaged by simply unscrewing and removing valve element guide 45.

As shown in FIG. 3, cavity 49 may surround more than 180 degrees of the o-ring's cross-section circumference, essentially trapping sealing element 48 within valve seat surface 42. This captured configuration may be desirable, for instance, under high flow and/or high pressure conditions as a means of preventing o-ring blow out. Even further, resilient sealing element 48 may be compressed between the two adjacent valve seat surface elements 45, 47. This compressed configuration may provide even further assurance that sealing element 48 will not be blown out during high flow and high pressure conditions.

The arrangement of the soft seal of resilient sealing element 48 and the hard stop of seat insert element 47 provides a zero or near zero leakage design. For example, leakage rates of pressurized helium as low as 0.001 standard cube centimeters per second may be achieved.

Figure 4:
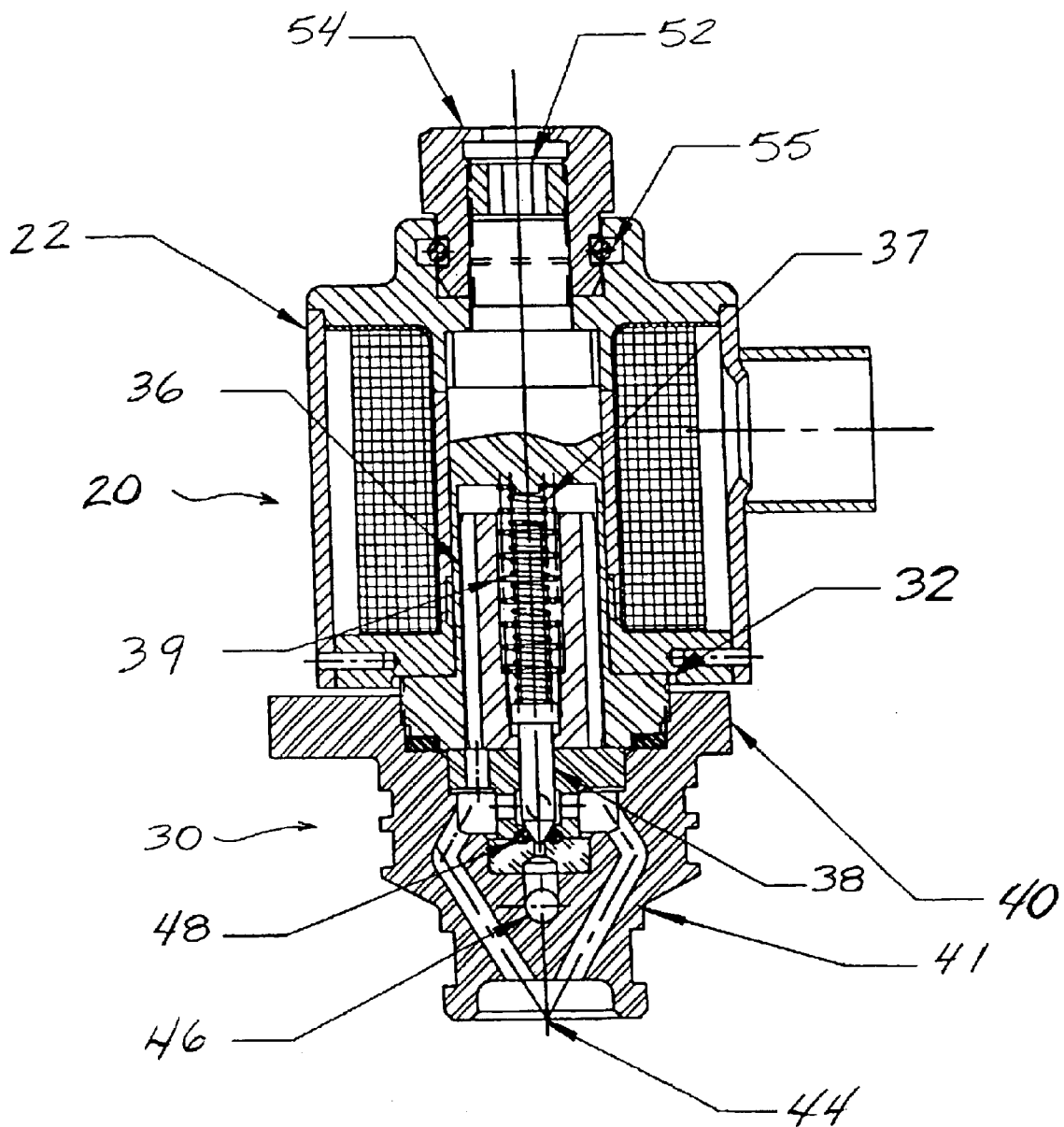
FIG. 4 is a partial section view of a valve in accordance with another exemplary embodiment of the present invention.
Figure 5:
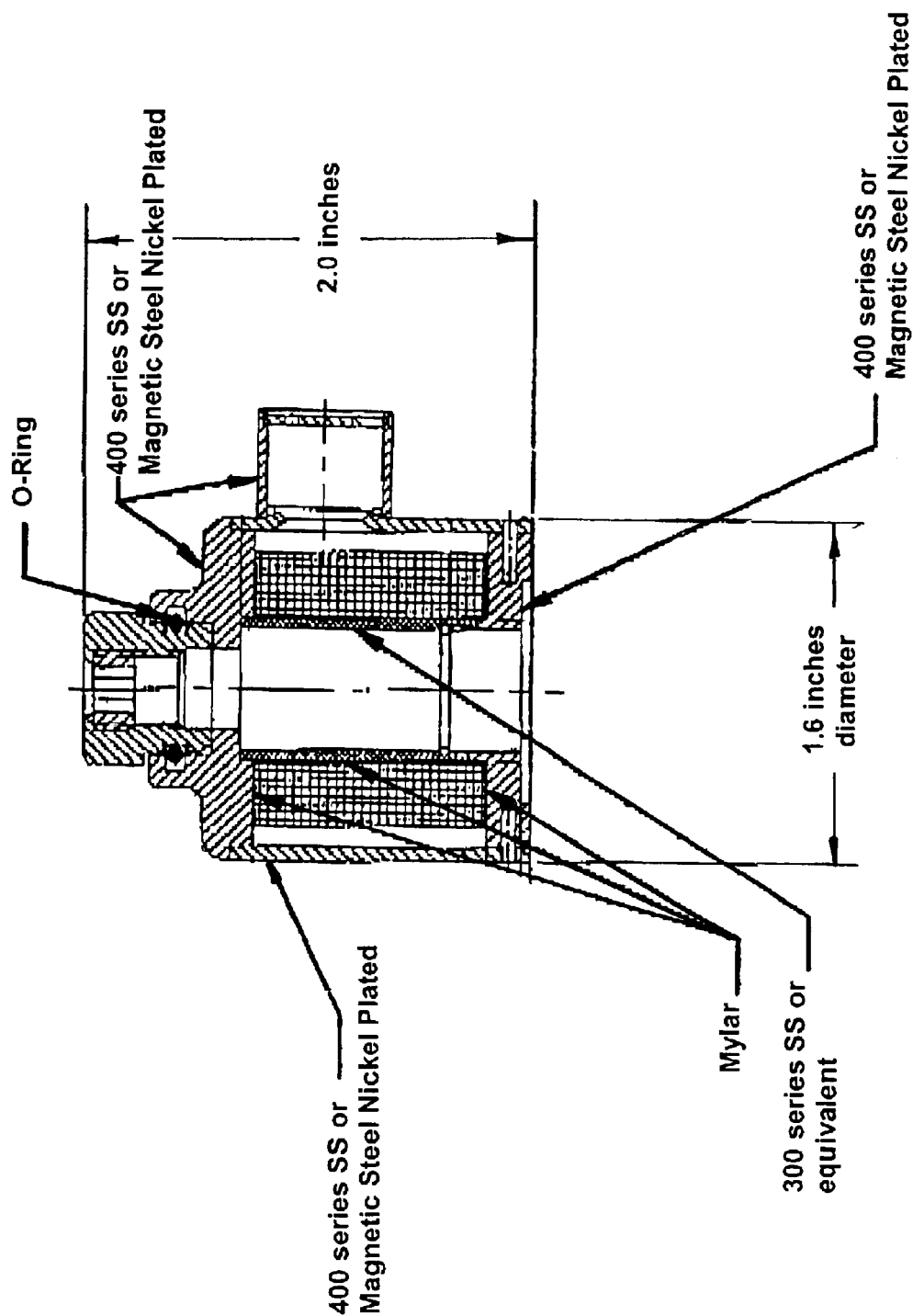
FIG. 5 is a dimensioned cross section view of an exemplary solenoid assembly, with additional design data, as may be used in the exemplary embodiment of FIG. 1.

As shown in FIGS. 1, 2 and 4, valve body 40 includes at least one inlet port 44 and at least one outlet port 46. The specific arrangements of the inlet ports 44 and the outlet ports 46 may be determined by persons of ordinary skill in the art. Valve body 40 has a mounting portion 41 which may be configured to plug, snap, or twist into a manifold mounting (not shown). Alternative mounting configurations (plug in or thread in) that are readily apparent to persons of ordinary skill in the art for mounting valve body 40 are considered to be within the scope of the present invention.

In one aspect of the invention, as illustrated in FIGS. 1 and 4, valve body 40 may have a common mounting portion geometry, but two different arrangements of inlet ports 44 and outlet ports 46 to facilitate or simplify manifold design. The first arrangement of inlet and outlet ports may, for instance, correspond to an intake valve configuration; the second arrangement of inlet and outlet ports may correspond to an exhaust valve configuration. Manufacture of the manifold may be simplified by having the same mounting geometry for both the intake and exhaust valves. With reference to the drawings, valve body 40 may be provided with a first exterior geometry for its mounting portion 41 and with a first arrangement of inlet ports 44 and outlet ports 46, as shown in FIG. 1. Valve body 40 may be provided with the same exterior geometry for its mounting portion 41 as in FIG. 1, but with a second arrangement of inlet ports 44 and outlet ports 44, as shown in FIG. 4. As can be seen, mounting portion 41 of FIG. 1 is substantially identical to mounting portion 41 of FIG. 4.

Referring to FIG. 1, electromagnetic solenoid assembly 20 is shown removably coupled to valve assembly 30 by a fastening device 50. Second end 35 of valve sleeve 32 may be threaded and fastening device 50 may include a nut 54 having complementary threads. Electromagnetic solenoid assembly 20 may be coupled to valve assembly 30 by inserting valve sleeve 32 through throughbore 26 of housing 22 and then screwing fastening device 50 onto second end 35 of valve sleeve 32.

Fastening device 50 may be retained by electromagnetic solenoid assembly 20 when electromagnetic solenoid assembly 20 is uncoupled from valve assembly 30. Thus, fastening device 50 is prevented from becoming a separate, easily lost, item. To keep fastening device 50 coupled to electromagnetic solenoid assembly 20, a retaining element 55 is located between fastening device 50 and electromagnetic solenoid assembly 20. As shown in FIG. 1, retaining element 55 is a ring, such as an o-ring, gasket, or snap ring placed in a circumferential channel 56 in a throughbore of mounting hub 28. Fastening device 50 may be provided with a corresponding circumferential channel 57, such that when fastening device 50 is pushed into the throughbore of mounting hub 28, retaining element 55 snaps or rolls into channel 57. Alternatively, retaining element 55 could be a one or more ball-and-socket detent mechanisms, a series of flexible fingers having ridges that interact with an overhang, or other alternative configurations in accordance with the present invention as may be readily apparent to persons of ordinary skill in the art. Retaining element 55 may be formed of any suitable material, for instance, a plastic, a metal, or a combination of metal and plastic.

Further, a locking element 52 may be provided to keep fastening device 50 from loosening up, for instance, due to vibration loads. As shown in FIG. 1, locking element 52 is a set screw having external threads for mating with the internal threads of fastening device 50. Locking element 52 in a first locking element position, is configured to prohibit the unscrewing or loosening of fastening device 50 from second end 35 of valve sleeve 32. In one aspect of the invention, fastening device 50 retains or captures locking element 52 even when locking element 52 is in its unlocked position. Thus, locking element 52 is prevented from becoming a separate, easily lost, item.

Other embodiments of the invention will be apparent to those skilled in the art from consideration of the specification and practice of the invention disclosed herein. It is intended that the specification and examples be considered as exemplary only, with a true scope and spirit of the invention being indicated by the following claims.

I claim:

1. A valve comprising:
    an electromagnetic solenoid assembly;
    a valve assembly;
    a fastening device configured to removably couple said electromagnetic solenoid assembly to said valve assembly, said fastening device being retained by said electromagnetic solenoid assembly when said electromagnetic solenoid assembly is uncoupled from said valve assembly, and wherein said electromagnetic solenoid assembly includes a housing and an electromagnetic coil mounted within said housing, and wherein said valve assembly includes a valve sleeve having first and second ends and extending through said housing and through said electromagnetic coil, a valve body coupled to said first end of said valve sleeve, said valve body having a valve seat surface, at least one inlet port, and at least one outlet port, a plunger movable from a first plunger position when a current in said electromagnetic coil is at a first level to a second plunger position when said current in said electromagnetic coil is at a second level, and a valve element having a seating surface to seat against said valve seat surface, said valve element movable from a closed, seated position when said plunger is in said first plunger position to an open, unseated position when said plunger is in said second plunger position.

2. The valve of claim 1, wherein said second end of said valve sleeve has threads, said fastening device has complementary threads, and said electromagnetic solenoid assembly is coupled to said valve assembly by screwing said fastening device onto said second end of said valve sleeve.

3. The valve of claim 2, further including a locking element having threads for mating with said threads of said fastening device, said locking element in a first locking element position configured to prohibit the unscrewing of said fastening device from said second end of said valve sleeve.

4. The valve of claim 1, further including a locking element configured in a first locking element position to prohibit movement of said fastening device relative to said valve assembly and in a second locking element position to allow movement of said fastening device relative to said valve assembly.

5. The valve of claim 4, wherein said fastening device is configured to retain said locking element when said locking element is in both said first and said second locking element positions.

6. The valve of claim 1, wherein said valve assembly further includes a first spring element to bias said valve element relative to said valve body and a second spring element to bias said plunger relative to said valve body.

7. The valve of claim 6, wherein said first spring element biases said valve element toward said valve seat surface and said second spring element biases said plunger toward said first plunger position.

8. The valve of claim 1, wherein said valve body is configured to plug into a manifold mounting.

9. The valve of claim 1, wherein said valve body has one of a first manifold mounting portion shape with a first arrangement of inlet and outlet ports and a second manifold mounting portion shape with a second arrangement of inlet ports and outlet ports, and wherein said first manifold mounting portion shape is substantially identical to said second manifold mounting portion shape.

10. The valve of claim 1, wherein said valve seat surface includes a resilient sealing element.

11. The valve of claim 10, wherein said resilient sealing element is an o-ring.

12. The valve of claim 10, wherein said resilient sealing element is captured in a cavity formed from two adjacent valve seat surface elements.

13. The valve of claim 10, wherein said valve seat surface further includes a hard stop element, such that said valve element in said closed, seated position provides a substantially zero leakage valve closure.

14. A valve comprising: an electromagnetic solenoid assembly; a valve assembly; a fastening device configured to removably couple said electromagnetic solenoid assembly to said valve assembly, said fastening device being retained by said electromagnetic solenoid assembly when said electromagnetic solenoid assembly is uncoupled from said valve assembly; and further including a retaining element located between said fastening device and said electromagnetic solenoid assembly.

15. The valve of claim 14, wherein said retaining element is a retaining ring formed from one of a plastic, a metal, and a combination of metal and plastic.

16. A valve comprising:

an electromagnetic solenoid assembly;

a valve assembly coupled to said solenoid assembly, said valve assembly including a valve body having a valve seat surface, and a valve element having a seating surface to seat against said valve seat surface, said valve element movable from a closed, seated position to an opened, unseated position;

a resilient sealing element forming at least a portion of said valve seat surface; and a fastening device configured to removably couple said electromagnetic solenoid assembly to said valve assembly, said fastening device being retained by said electromagnetic solenoid assembly when said electromagnetic solenoid assembly is uncoupled from said valve assembly.

17. The valve of claim 16, wherein said resilient sealing element is an o-ring.

18. The valve of claim 16, wherein said resilient sealing element is captured in a cavity formed from two adjacent valve seat surface elements.

19. The valve of claim 18, wherein said resilient sealing element is replaceable.

20. The valve of claim 16, wherein said resilient sealing element is compressed between said two adjacent valve seat surface elements.

21. The valve of claim 16, wherein said valve seat surface further includes a hard stop element, such that said valve element in said closed, seated position provides a substantially zero leakage valve closure.

22. A valve comprising:

an electromagnetic solenoid assembly;

a valve assembly coupled to said electromagnetic solenoid assembly, said valve assembly including a valve body having a valve seat surface, a plunger movable from a first plunger position when a current in said electromagnetic solenoid assembly is at a first level to a second plunger position when said current in said electromagnetic solenoid assembly is at a second level, and a valve element having a seating surface to seat against said valve seat surface, said valve element movable from a seated position when said plunger is in said first plunger position to an unseated position when said plunger is in said second plunger position; and a first spring element to bias said valve element relative to said valve body and a second spring element to bias said plunger relative to said valve body, a portion of said first spring element and a portion of said second spring element being located within a volume defined by said electromagnetic solenoid assembly.

23. The valve of claim 22, wherein said first spring element biases said valve element toward said valve seat surface and said second spring element biases said plunger toward said first plunger position.

24. The valve of claim 22, wherein said first spring element is a first compression spring, second spring element is a second compression spring, and said first and second compression springs are coaxially aligned.

* * * * *